Dec. 20, 1960   J. C. DUDDY   2,965,697
BATTERY DIAPHRAGM
Filed Nov. 5, 1956

INVENTOR.
JOSEPH C. DUDDY
BY
ATTORNEY

United States Patent Office 2,965,697
Patented Dec. 20, 1960

2,965,697

BATTERY DIAPHRAGM

Joseph C. Duddy, Langhorne, Pa., assignor to The Electric Storage Battery Company, a corporation of New Jersey Filed Nov. 5, 1956, Ser. No. 620,504

2 Claims. (Cl. 136—146)

This invention relates to diaphragms and to methods of producing them and has for an object the production of diaphragms characterized by the fact that all of the pores of a highly porous carrier are so completely filled with a solid polyelectrolyte that there is produced a continuous phase throughout the porous carrier.

Though the diaphragms of the present invention have uses coextensive with the applicability of ion exchange resins, the present invention is primarily concerned with battery diaphragms differing in kind from those previously known or used. The diaphragms or membranes of the present invention are particularly useful in alkaline cells, such as the silver-zinc type and the nickel-cadmium type, but diaphragms embodying the present invention may be applied to other types of batteries including the lead-acid type.

In secondary batteries of the alkaline type, and in particular the silver-zinc storage battery, shortness of life has been an unwanted characteristic. Many theories have been advanced to explain the phenomena which bring about self-discharge and deterioration of the electrodes or plates, particularly the negative plates, as for example by "treeing," and by disintegration and failure of conventional cellulosic type of membrane material used for plate separation.

The present invention is not based upon the acceptance of any one or more of the many theories, two of which have been mentioned. It is based upon the discovery that long life in a silver-zinc battery can be achieved by the use of a solid polyelectrolyte which is wholly inert to the battery electrolyte in the sense that it is not destroyed or distintegrated thereby. The solid polyelectrolyte in membrane or diaphragm form has the further and very desirable characteristic of preventing migration therethrough in colloidal form of electrode material. The solid polyelectrolyte does not appear to be oxidized by virtue of contact with the active material of either electrode; yet it offers relatively low resistance to the transfer therethrough of current-carrying ions.

In carrying out the invention in one form thereof a porous carrier of insulating material inert to the battery electrolyte is impregnated with the monomeric ingredients of a polymeric form of an ion exchange resin which include a catalyst. Porous carriers meeting the foregoing requirements are many in number and include asbestos as an example of a suitable inorganic carrier, and polyethylene, and polyvinyl chloride and its copolymers, as examples of suitable organic carriers. The organic carriers are conceived as having a continuous matrix, whereas the inorganic carriers, asbestos, are of fibrous form. The materials, per se, of the examples of the carriers mentioned above have in common the feature of being transparent.

The polymeric form of the ion exchange resin for batteries having an alkaline electrolyte is preferably of the carboxylic acid type, though it may be of other types, such as the sulfonic acid type, exhibiting the characteristics hereinafter to be set forth. The impregnating step is carried to a point where the impregnant completely excludes the air phase within the porous carrier. There is then produced controlled polymerization of the monomeric ingredients to produce in situ within the pores of the porous carrier a continuous phase of the polymeric form of the ion exchange resin. The polymerization is carried out under the controlled conditions of heat transfer in avoidance of introduction or production of a gaseous phase in the impregnated carrier and in avoidance of evaporation of the volatile ingredients and in avoidance of disruption of the continuous phase of the resin.

In one form of the invention, heat is uniformly applied to opposite surfaces of the impregnated porous carrier to elevate the temperature of the monomeric ingredients and so to initiate polymerization. The latter, being an exothermic reaction, generates heat. There is provided a heat-applying means having the capability of acting as a moderator for flow of heat away from, as well as to, the impregnated carrier for the continuance of the polymerization reaction at a slow rate and quietly in avoidance of production of gas, reintroduction of air, disruption of phase, and the like. Such heat-transfer means may be in the form of a liquid bath or in the form of heat-applying platens which include heat-buffering elements between them and the porous carrier.

The end product from the foregoing process is a diaphragm which is itself new. In terms of battery application, it consists of a solid polyelectrolyte having the highest degree of electrochemical activity in terms of its ion-exchange capabilities. The diaphragm includes throughout the thickness thereof a uniform distribution of the carrier and a uniform distribution of the cross-linked polymeric ion exchange resin. There are present two complete homogeneous phases forming an equally complete heterogeneous phase diaphragm having the highest degree of permselectivity and conductance. Because of the completeness of phase continuity, the new diaphragm exhibits an outstanding characteristic in that it is more transparent than translucent and in its preferred form is so uniformly solid throughout in respect to the material of the porous carrier and in respect to the ion exchange resin that the diaphragm is transparent to a relatively high degree.

Due to their porosity, the carriers initially appear quite opaque. However, where their materials are per se transparent, their apparent opaqueness disappears in the diaphragm of the present invention and thus the end product has the transparency referred to above.

It is again emphasized that the transparency per se is of importance to the present invention in that it provides a convenient and readily available measure of the complete solid state of homogeneity of the two phases of the final heterogeneous diaphragm.

For further objects and advantages of the invention and for a more detailed presentation of theory and of constructional details, reference is to be had to the following detailed description taken in conjunction with the accompanying drawings, in which:

Fig. 1 is a perspective view of a tubular form of a porous carrier;

Fig. 2 diagrammatically illustrates an apparatus for impregnating the porous carrier of Fig. 1;

Fig. 3 diagrammatically illustrates apparatus suitable for controlled polymerization of the impregnated carrier;

Fig. 4 diagrammatically illustrates conventional rinsing apparatus;

As mentioned above, the present invention is applicable to porous carriers of many types. It is important to the present invention to have a carrier of maximum porosity and characterized by the presence of an unusually large number of interconnected pores which contribute to the homogeneity which will later be discussed herein. As a storage battery diaphragm, particularly when in tubular form, the thermoplastic materials including polyethylene, polyvinyl chloride, and the copolymers of the latter are to be preferred, since they lend themselves to shaping processes by extrusion. Such materials may be made microporous, from 65% to 92%, by methods of the type disclosed in Honey and Hardy Patent No. 2,542,527, and particularly as disclosed by me in my Patent No. 2,676,929.

Figure 1:

As shown in Fig. 1, a porous material 10 is illustrated in tubular form and generally rectangular in shape. Where the battery separator is to be flat, asbestos can be used, though the organic thermoplastic carriers will in general be preferred. The porous carrier is first impregnated with the monomeric ingredients of the selected ion exchange resin. For an ion exchange resin of the carboxylic type, the following materials will be utilized:

| | Parts by weight |
|---|---|
| Methacrylic acid (including 0.1% hydro-quinone as polymerization inhibitor) | 100 |
| Divinyl benzene | 20 |
| Benzoyl peroxide | 4 |

The divinyl benzene is a cross-linking agent, commercially available in a solution of approximately 50% purity, and in the foregoing table the commercially available form has been utilized. For pure divinyl benzene, about ten parts will suffice. The proportions in the above table are preferred, but not critical, in the sense that there may be considerable deviation in the cross-linking agent.

Figure 2:
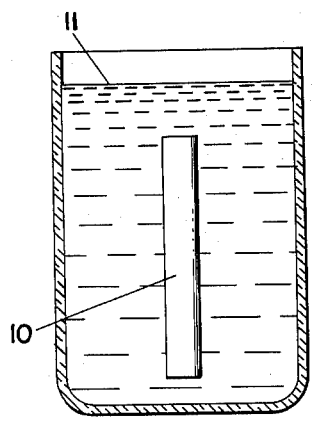

With the impregnant comprising a mixture of the monomeric ingredients as indicated above, the porous carrier, preferably after a preliminary treatment to insure the absence therein of any starch or other residue of pore-forming agents is impregnated under conditions which will assure the complete exclusion of the air phase throughout the porous carrier. As shown in Fig. 2, the porous tube 10 is immersed in a bath 11 of the monomeric material. Immersion over an adequate length of time, depending on the thickness, will assure the exclusion of the air phase and the complete filling of the pores of the carrier 10 with impregnant for the following reasons.

The monomeric impregnant has a low surface tension which greatly aids in its entry into the pores of the carrier. The impregnant also has the capability of wetting the surface of the carrier by virtue of a mild solvent action thereon, these factors combining to achieve the complete filling of the pores for the complete displacement of air and gases entrapped within the pores. The time of immersion will be selected for production of maximum translucency in the intermediate product and maximum transparency of the end product as will be later more fully explained. For a carrier of polyvinyl chloride having a thickness between about ten-thousandths and twenty-thousandths of an inch, immersion in the impregnant for a time of approximately five hours has been found sufficient to produce maximum translucency. For more rapid impregnation of the porous carrier, alternate application of vacuum and the impregnant may be utilized.

It is important to the present invention that the porous carrier shall contain the impregnant to the complete exclusion of air in order that there can be assured the formation in situ of a continuous homogeneous resin of the carboxylic type. In order to achieve the foregoing objective, it is likewise necessary that the polymerization of the impregnant be carried out under such control conditions as to prevent disruption of the continuity of the monomeric or the polymeric phase. Accordingly, polymerization is initiated by heat-transfer means which initially elevates the temperature of the monomeric impregnant to a point where polymerization is initiated. Since this is an exothermic reaction, the transfer of heat reverses as the temperature rises above the initiating temperature with flow of heat to the heat-applying means to control in an isothermic manner the temperature of the impregnated carrier.

Figure 3:
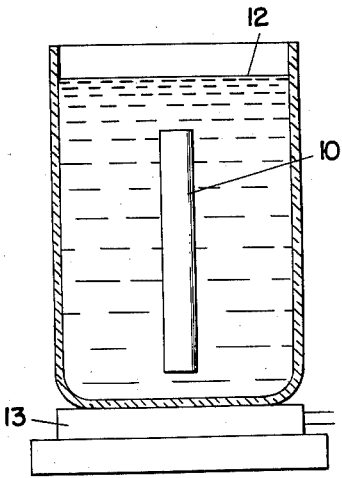

In one form of the invention, there will preferably be utilized a liquid bath of the type in which the monomeric ingredients are immiscible and insoluble. For example, Fig. 3, the liquid heat-exchange means may be a bath of saturated aqueous sodium sulphate 12 maintained at a temperature of about 95° C. as by a hot-plate or other suitable heating means 13. Upon immersion of the tubular porous carrier 10, there will be gradual heating until polymerization is initiated at 95° C., after which there will be reversal of flow of heat to the bath to control the temperature of the porous carrier. The heat-exchange means comprising the bath 12 buffers the exothermic evolution of heat to maintain tube 10 at substantially the temperature of the bath 12. The bath controls the polymerization in avoidance of any disruption of the continuity of the monomeric ingredients established by the impregnating step. With the bath 12 maintained at about 95° C., after immersion of the porous carrier therein, polymerization will be initiated and polymerization will be completed in about fifteen minutes for the example set forth above.

By strictly observing the foregoing instructions, there will be produced an end product in which the polymerized monomeric ingredients are converted in situ to the polymeric form.

The tube 10 as a whole will be translucent but is not likely to exhibit the same degree of transparency as the flat diaphragms made by a modification of a step of the process later to be outlined.

Figure 4:
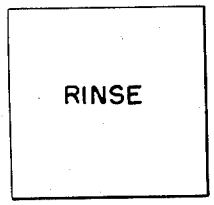

Upon completion of polymerization, the tubular diaphragm 10 is removed from the heat-transfer means and rinsed, Fig. 4, with water to remove the bath material. The diaphragm 10 will be relatively rigid and will have substantially the same dimensions as the original porous carrier of Fig. 1.

Figure 5:
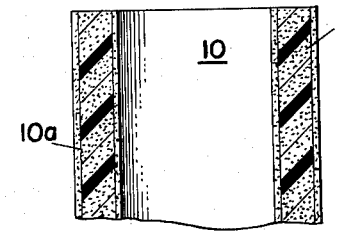
Fig. 5 is an enlarged cross-sectional view of the carrier 10 after completion of the polymerization and rinsing.

As shown in large sectional view in Fig. 5, the tubular diaphragm 10 has walls which are translucent and has intermediate portions as shown at 10a and 10b of complete solid state homogeneity. A slight amount of the ion exchange resin at the surface may be removed during the polymerizing step and thus there will likely be present a lower concentration of the ion exchange resin at the surface. But this concentration quickly rises to the point of solid state continuity at a point immediately below the surface. It is this phenomena which gives rise to the translucency of the diaphragm. Where the solid state continuity is complete, there will be transparency instead of translucency.

It has been found that where there is a maximum loading of a highly porous carrier of the expanded microporous type (one made pursuant to said Patents 2,542,527 and 2,676,929, but where the filler, as starch, is removed while the carrier is swollen), internal stresses arise in the final product if the conversion of the ion-exchange resin from the acid or hydrogen to the salt form is attempted in a high concentration of alkali. The stresses are likely to be excessive even though the conversion temperature, including that of the swelling medium, be above the softening point of the thermoplastic resin comprising the carrier matrix. These stresses which produce internal stress-cracking apparently result from differential rates of conversion as between the surface and the interior of the membrane. Apparently by reason of the high loading, that is, the complete filling of the large number of pores of the highly porous carrier, the carrier matrix cannot physically yield at rates imposed by the large differentials in the rates of conversion.

Because of the foregoing considerations, it is desirable to produce the conversion in the following manner. First, the membrane resulting from the polymerization process is immersed in a weak alkali solution, for example, from 0.25% to 0.50% potassium hydroxide. The solution is maintained at or near the boiling point, as about 102° C. Diaphragms having thicknesses in the range of from 0.010 inch to 0.020 inch are immersed in the alkali solution for about thirty minutes, during which period the membrane swells slowly and uniformly to approximately its maximum dimensions. The membrane may now be washed and dried. It is then ready for use in apparatus for electrodialysis and in other applications where the polyelectrolyte may be functionally important, as in water treatment. For applications in batteries, it is desirable to follow the treatment in the weak alkali solution by a further treatment in a hot strong alkali, for example, from 30% to 40% potassium hydroxide. The strong alkali solution, i.e., the electrolyte bath 14 is maintained, as by a hot plate 15, above the softening temperature of the porous thermoplastic synthetic resin material. For polyvinyl chloride, this temperature will be of the order of 100° C.

Where the diaphragm or membrane is washed and dried after completion of the treatment in the weak alkali solution, the final membrane will have returned to approximately its original dimensions, i.e., those it had after the impregnating polymerization steps. The diaphragm will be pliable. By re-wetting and re-drying, it can again be expanded and contracted. Its pliability in the dry state is believed to be due to the absence of internal stresses avoided by the conversion in the weak alkali solution. Its pliability increases with rise in ambient humidity. Such weak solution is believed to have a lower diffusion characteristic than the strong solution, and the conversion rate is lower. There are thus avoided the differential rates of swelling.

The foregoing immersions and heat treatments will bring about an expansion of the thermoplastic material which apparently occurs by reason of the change of the ion exchange constituent from the hydrogen to the salt form of the ion. The foregoing steps are of importance in imparting to the diaphragm low electrical resistivity. After completion of the foregoing steps, the diaphragm 10 has adequate dimensional stability to make possible close clearances in the encirclement of the electrodes by the tubular diaphragm.

Figure 7:
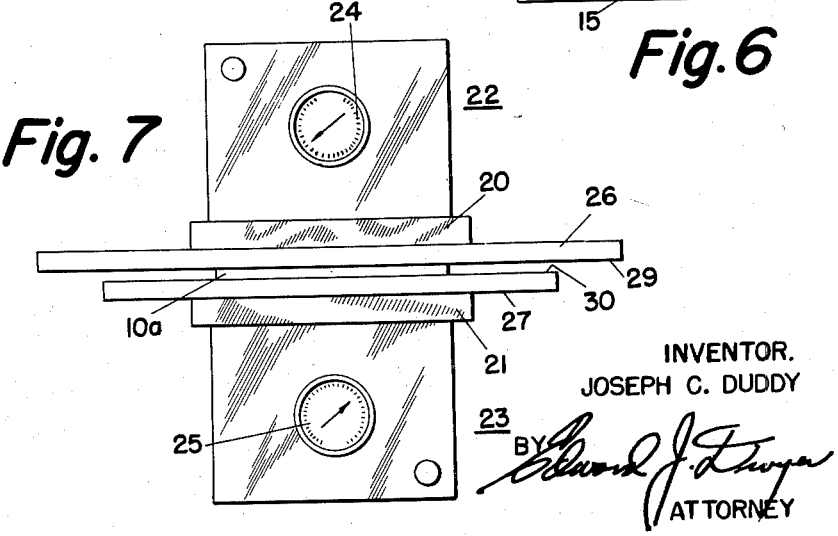
Fig. 7 illustrates apparatus for in situ controlled polymerization of an impregnated flat or film material.

If the porous carrier, selected from the above-identified materials, be flat, as a film, the impregnating step will be carried out in the same manner as described above and as by immersion of the film or strip in the solution 11 of Fig. 2. After there has been established throughout the film the monomeric ingredients to the exclusion of all air and gases, the film, Fig. 7, is placed between two heated platens 20 and 21 where the polymerization takes place. The platens 20 and 21 may be those of hot plates 22 and 23, of conventional design, and preferably including temperature indicators and controls 24 and 25. While the platens 20 and 21 may be utilized, as heat buffering elements, it is preferred that such buffering elements 26 and 27 be of other material, such as heat-resistant glass available on the market under the trademark "Pyrex." The impregnated film or strip 10A is interposed between the buffering elements 26 and 27. Preferably, the opposing surfaces of elements 26 and 27 are covered with a material to which neither the monomeric and polymeric constituents nor the thermoplastic material will strongly adhere. Sheets of cellophane 29 and 30 are satisfactory for this purpose. If there is adherence, the cellophane is readily removed by immersion of the film 10A in water. The cellophane will preferentially swell and can be peeled from the film 10A.

After placing the film 10A between the cellophane sheets and the buffering elements 26 and 27, the platen 20 is lowered into contact with the two energized hot plates 22 and 23. The heat controls 24 and 25 are set for bath temperature of around 95° C. As the temperature of the film 10A approaches the foregoing temperature, polymerization of the monomeric ingredients is initiated and the polymerization proceeds rapidly. Heat generated by the exothermic polymerization reaction then flows outwardly from the buffering elements 26 and 27 serving to moderate the temperature of polymerization. Preferably, pressures from four to five pounds per square inch are applied to prevent evaporation of the polymeric material during polymerization. Such pressures are effective in preventing evaporation due to the confinement of the film 10A between the buffering elements 26 and 27. The applied pressures, in addition to preventing evaporation of the volatile monomeric constituents, produce controlled exclusion of atmospheric oxygen during the time there are established the desirable heat-transfer conditions for removing heat from the polymerization reaction and contribute to the establishment of an isothermic reaction.

The foregoing platen-pressure aids in compensation for dimensional changes of the thermoplastic matrix due to the reduced volume of the monomeric ingredients which occurs during polymerization. Thus, since the pores were initially fully filled with such ingredients, in the end product the pores are fully filled with the ion exchange resin. The pores will then be of slightly decreased size. The capability of the synthetic resin materials, providing a thermoplastic matrix, in accommodating spacial changes assures the maintenance and ultimate attainment of the desired complete solid state of homogeneity of the two phases in the final heterogeneous diaphragm. That diaphragm 10A, with any of the above porous materials including asbestos, is transparent to a high degree and does not exhibit the translucence of the diaphragm made by the immersion-polymerization step and caused by the surface discontinuity of the ion exchange resin. In general, the process including the application of heat and pressure in manner just described is to be preferred. In this connection, the low pressures indicated above are desirable, and high pressures are to be avoided since they tend to and will, if sufficiently high, inhibit polymerization of the monomeric materials.

Figure 6:
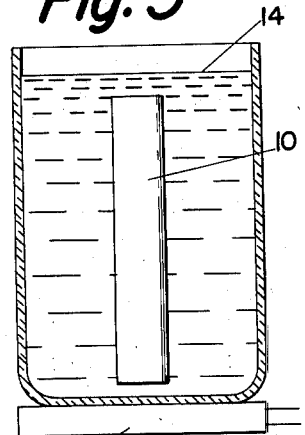
Fig. 6 illustrates apparatus suitable for carrying out the swelling of the polymerized diaphragm.

The transparent diaphragm 10A, if having a thermoplastic matrix, is subjected to the swelling step, Fig. 6, at a temperature above the softening temperature of the thermoplastic material. Thereafter, the diaphragm 10A is ready for use in storage batteries.

For batteries with alkaline electrolytes the exchange resins will be of the cation-exchange type, those mentioned above, of the carboxylic or sulfonic acid type, being suitable examples. For electrolytes of the acid type, such as sulphuric acid, the ion exchange polymeric constituent of the membrane will be the anion-exchange type whose structural units contain amine type functional groups. This exchanger polymer is produced in situ in the carrier polymer matrix in a manner similar to that described above for the cation-exchanger type membrane. Conversion from the base to the salt form is by equilibration in the acidic mediums with observance of the conditions of temperature and concentration as specified for the cation-exchange membrane. The following is an example of a suitable mixture of monomeric ingredients and catalyst to produce such an amine type anion exchange membrane:

| | Parts by weight |
|---|---|
| Vinyl pyridine (uninhibited) | 100 |
| Divinyl benzene (50–55% purity) | 20 |
| Benzoyl peroxide | 1.5 |

Diaphragms embodying the present invention and made in the manner explained above are characterized by the fact that they have deposited completely throughout the pores of a porous carrier a solid polyelectrolyte. The diaphragms are characterized by their impermeability to transfer therethrough of colloidal forms of electrode material. Accordingly, such diaphragms establish an effective barrier for the electrodes and thus prevent transfer to either of them material from the other of them. The polyelectrolyte is a polymeric form of an ion exchange resin and in these diaphragms has a completeness of homogeneity throughout the carrier for the highest electrochemical activity and electrical conductance. It is this latter feature which produces a lower internal resistance to a battery as compared with batteries having other types of separators or diaphragms. The provision of a solid polyelectrolyte which exhibits impermeability to transfer of colloidal forms of electrode material and which at the same time provides for conduction of current-carrying ions therethrough represents a near-approach to the ultimate in desired characteristics of battery diaphragms and in ion exchange membranes for other applications including electrodialysis apparatus.

What is claimed is:

1. The combination, in an alkaline type of battery, of at least one negative electrode and at least one positive electrode of silver, and a diaphragm interposed between said positive and negative electrodes comprising a chemically inert, highly porous carrier characterized by its large number of interconnected pores, which carrier has completely throughout its pores a solid polyelectrolyte characterized by its impermeability to transfer therethrough of colloidal forms of matter including silver, said polyelectrolyte being a polymeric form of ion exchange resin polymerized in situ from monomeric ingredients of said ion exchange resin and having a completeness of continuity of phase throughout said interconnected pores of said carrier which establishes a high degree of electrochemical activity, a high degree of permselectivity, and a high degree of electrical conductance.

2. The combination, in an electric battery, of at least one negative electrode selected from the group consisting of cadmium and zinc and at least one positive electrode selected from the group consisting of nickel and silver, and a diaphragm interposed between said positive and negative electrodes comprising a highly porous, thermoplastic matrix characterized by its large number of interconnecting pores and selected from the group consisting of polyethylene, polyvinyl chloride and its copolymers, which thermoplastic matrix has present throughout its pores a solid polyelectrolyte consisting of the polymerized monomeric ingredients of an ion exchange resin including a cross-linking agent, said polymerized ingredients having a completeness of continuity of phase throughout said pores evidenced by the transparency of the diaphragm, and its high degree of electrochemical activity.

References Cited in the file of this patent

UNITED STATES PATENTS

| | | |
|---|---|---|
| 2,564,397 | Duddy | Aug. 14, 1951 |
| 2,636,851 | Juda et al. | Apr. 18, 1953 |
| 2,653,986 | Philipps | Sept. 29, 1953 |
| 2,653,987 | Baty | Sept. 29, 1953 |
| 2,662,107 | Uhlig et al. | Dec. 8, 1953 |
| 2,700,063 | Manecke | Jan. 18, 1955 |
| 2,702,272 | Kasper | Feb. 15, 1955 |
| 2,816,154 | Mendelsohn | Dec. 10, 1957 |
| 2,837,496 | Vandenberg | June 3, 1958 |

OTHER REFERENCES

American Chemical Society, Abstracts of Papers of 130th Meeting, Division of Polymer Chem., Paper No. 28, page 135. Received in Scientific Library August 30, 1956.